US011860326B1

(12) United States Patent
Tian et al.

(10) Patent No.: US 11,860,326 B1
(45) Date of Patent: Jan. 2, 2024

(54) FAULT CHARACTERIZATION METHOD AND SYSTEM FOR PRECISE NAVIGATION OF DEEP OIL AND GAS BASED ON IMAGE FUSION

(71) Applicant: Institute of Geology and Geophysics, Chinese Academy of Sciences, Beijing (CN)

(72) Inventors: Fei Tian, Beijing (CN); Wenhao Zheng, Beijing (CN); Jiangyun Zhang, Beijing (CN); Wenxiu Zhang, Beijing (CN); Yongyou Yang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/348,212

(22) Filed: Jul. 6, 2023

(30) Foreign Application Priority Data

May 16, 2023 (CN) .......................... 202310546021.2

(51) Int. Cl.
*G01V 1/30* (2006.01)
*G01V 1/28* (2006.01)
(52) U.S. Cl.
CPC .............. *G01V 1/306* (2013.01); *G01V 1/282* (2013.01); *G01V 1/307* (2013.01)
(58) Field of Classification Search
CPC ......... G01V 1/306; G01V 1/282; G01V 1/307
See application file for complete search history.

(56) References Cited

U.S. PATENT DOCUMENTS 10,948,618 B2 * 3/2021 Bandura ................ G06N 20/00

FOREIGN PATENT DOCUMENTS

| AU | 2008323606 A1 * | 6/2010 | .......... G01R 33/022 |
| CA | 2792052 A1 * | 9/2011 | .............. G01V 1/28 |
| CN | 102141633 A | 8/2011 | |
| CN | 103837889 A | 6/2014 | |
| CN | 113311485 A | 8/2021 | |

* cited by examiner

*Primary Examiner* — Elias Desta
(74) *Attorney, Agent, or Firm* — Nitin Kaushik

(57) ABSTRACT

The present invention belongs to the field of geological exploration and specifically relates to the fault characterization method and system for precise navigation of deep oil and gas based on image fusion, aiming to solve the problem that faults in deep formations are difficult to characterize with conventional seismic interpretation methods. The present invention includes: obtaining amplitude gradient images by calculating amplitude gradient vectors; calculating dip attribute images based on the enhanced seismic data; fusing gradient amplitude attribute fault confidence region with dip angle attribute data volume that defines the fault position through a hierarchical wavelet transform method to obtain a superimposed fault attribute map; dividing bead-like structures based on superimposed fault attribute maps; calculating the score of branch fault data points based on the center point position of bead-like structures, and dividing and analyzing the dominant fault areas.

10 Claims, 6 Drawing Sheets

FAULT CHARACTERIZATION METHOD AND SYSTEM FOR PRECISE NAVIGATION OF DEEP OIL AND GAS BASED ON IMAGE FUSION

CROSS-REFERENCE TO RELATED APPLICATIONS

The application claims priority to Chinese patent application No. 2023105460212, filed on May 16, 2023, the entire contents of which are incorporated herein by reference.

TECHNICAL FIELD

The present invention belongs to the field of geological exploration and specifically relates to the fault characterization method and system for precise navigation of deep oil and gas based on image fusion.

BACKGROUND

Many karst fracture-cavity type oil and gas fields have been found in Tarim Basin, Ordos Basin, Sichuan Basin, etc., showing good exploration and development prospects. Deep carbonate rock oil and gas reservoirs are becoming the main targets of oil and gas exploration and development. The deep and large fault system plays an important role in reservoir dissolution and transformation, oil and gas migration and accumulation in oil and gas basins, and structural evolution. Scholars have explored the relationship between faults and oil and gas reservoirs from different perspectives, thereby improving the accuracy of precise navigation of deep oil and gas.

Years of exploration and development show that the stratigraphic structure, reservoir and oil and gas migration, and accumulation of Ordovician carbonate rock in the Tarim Basin are all controlled by deep fault systems. The fault zone usually has a complex three-dimensional spatial structure composed of fault cores and fracture zones, which makes the transmission and sealing characteristics of underground fluid far more complex than one-dimensional or two-dimensional geological models. Therefore, it is very important for the development of oil and gas reservoirs to reasonably describe the characteristics of fault systems using seismic data and fault formation mechanisms.

However, the fault system in the Tazhong area has the characteristics of multiple stages of activity, multiple types of development, and diverse stages of fault development and maturity. In addition, factors such as surface desert coverage, large burial depth of target layers, and low signal-to-noise ratio of seismic data make it difficult to identify and analyze faults. New methods and concepts need to be studied to redefine the structure of the fault system and refine the details of fault characteristics.

The fault phenomenon reflected by seismic data is a comprehensive geophysical response of a fracture zone. Therefore, the fault system anatomy based on seismic data requires certain basic assumptions. For example, a relatively stable fault zone with a fault range can be identified as a fault. It is crucial to fully apply the effective information of seismic data to guide the identification and interpretation of fault systems. Firstly, it is necessary to deepen the understanding of fault formation mechanisms and establish reasonable interpretation models; secondly, the potential of seismic data needs to be deeply explored and the spatial combination of attribute prediction parameters and multi-attribute comprehensive guidance faults needs to be optimized.

The geology of Craton has a stable internal structure and weak activity. The secondary activity of pre-existing structures often develops deep faults with short displacement and small fault displacement. Oil and gas exploration in Craton basin shows that the development of deep carbonate rock reservoirs is controlled by the internal faults of Craton, exhibiting a enrichment mode of "near source fault control". Due to the low vertical and horizontal resolution of earthquakes and the low signal-to-noise ratio of deep layers, conventional seismic interpretation is difficult to accurately depict complex faults. There are still many controversies over their tectonic evolution and formation mechanisms, leading to many difficulties in the exploration and geological navigation of deep oil and gas.

SUMMARY

To solve the above problems in existing technology, which are that existing fault identification methods are difficult to deal with the diverse characteristics of mature fault development stages, surface desert coverage, large burial depth of target layers, and low signal-to-noise ratio of seismic data, resulting in high analysis difficulty. Conventional seismic interpretation is difficult to accurately depict the problem, the present invention provides a fault characterization method for precise navigation of deep oil and gas based on image fusion, which includes:

Step S100, acquires the original seismic data, conducts spectral shaping on the original seismic data to obtain the reshaped seismic waveform data, and conducts diffusion filtering and dip filtering on the reshaped seismic waveform data to obtain enhanced seismic data; The order of diffusion filtering and dip filtering can be swapped;

Step S200, based on the enhanced seismic data, obtains the amplitude gradient image by calculating the amplitude gradient vector;

Calculate the dip attribute image based on the enhanced seismic data;

Step S300, based on the amplitude gradient image, obtains the gradient amplitude attribute fault confidence region through the ellipsoidal expansion method;

By multiplying the dip attribute image with the confidence region of the fault irregularly, the dip attribute data volume with limited fault location is obtained;

Step S400, fuses the gradient amplitude attribute fault confidence region with the dip angle attribute data volume that defines the fault position through a hierarchical wavelet transform method to obtain a superimposed fault attribute map;

Step S500, based on the superimposed fault attribute map, divides the bead-like structure;

Based on the center point position of the bead-like structure, the number of bead data points within the set bead distance range is recorded as the score of branch fault data points;

Step S600, determines whether the score of the branch fault data point is greater than the preset dominant fault score threshold, identifies the part that is greater than the preset dominant fault score threshold as the dominant fault area, and identifies the part that is less than the preset advantage fault score threshold as the non-dominant fault area;

Step S700, sets different bead distance ranges, and repeats Steps S500 to S600 to obtain graded dominant fault areas.

In some preferred embodiments, the spectral shaping includes:

The original seismic data includes a seismic record convolution model, which is represented in the frequency domain as:

$$s_{swa}(\omega)=\sigma(\Psi)\xi_{ft}(\omega)$$

Wherein, $s_{swa}(\omega)$ represents the seismic record after Fourier transform, $\sigma(\omega)$ represents the seismic wavelet after Fourier transform, $\xi_{ft}(\omega)$ represents the spectrum of reflection coefficient after Fourier transform, and $\omega$ represents the angular frequency;

Take the logarithm on both sides of the representation of the convolution model in the frequency domain to obtain the representation of the linear system of seismic records in the frequency domain:

$$ln s_{swa}(\omega)=ln\sigma(\omega)+ln\xi_{ft}(\omega)$$

Wherein, $ln s_{swa}(\omega)$ represents the linear system frequency domain representation of seismic record, $ln\sigma(\omega)$ represents the linear system frequency domain representation of seismic wavelet, and $ln\xi_{ft}(\omega)$ represents the linear system frequency domain representation of reflection coefficient;

Carry out inverse Fourier transform on the frequency domain representation of the linear system of the seismic record to obtain the complex cepstrum sequence of the seismic record spectrum:

$$\tilde{S}_{swa}(t_{swa})=\tilde{\sigma}(t_{swa})+\tilde{\xi}_{ft}(t_{swa})$$

Wherein, $\tilde{S}_{swa}(t_{swa})$ represents the complex cepstrum sequence of seismic waveform record, $\tilde{\sigma}(t_{swa})$ represents the complex cepstrum sequence of seismic wavelet, $\tilde{\sigma}_{swa}(t_{swa})$ represents the complex cepstrum sequence of stratum reflection coefficient, and $t_{swa}$ represents the arrival time of seismic wave;

The wavelet complex cepstrum sequence and reflection coefficient complex cepstrum sequence in the complex cepstrum are separated by a low-pass filter, and the wavelet amplitude is extracted;

Based on the wavelet amplitude, simulate the seismic wavelet amplitude spectrum using the least squares method:

$$\sigma(f)=A(f)f^{\alpha}e^{H(f)}$$

Wherein, the least squares fitting parameter $\alpha \geq 0$ is a constant, $\sigma(f)$ represents the wavelet amplitude spectrum, $H(f)$ and $A(f)$ represent the polynomial of $f$, $f$ represents the frequency of seismic wavelet, and $e$ represents the base number of natural logarithm;

Based on the amplitude spectrum of the simulated seismic wavelet, the maximum phase component and minimum phase component of the wavelet are obtained;

If the maximum phase component of the wavelet $\sigma(t)$ is $u_{pc}(t)$ and the minimum phase component of the wavelet is $v_{pc}(t)$, then the $\sigma(t)$ of the wavelet is:

$$\sigma(t)=u_{pc}(t)\cdot v_{pc}(t)$$

Wherein, $\sigma(t)$ is the amplitude spectrum; $u_{pc}(t)$ is the maximum phase component; $v_{pc}(t)$ is the minimum phase component;

The complex cepstrum of the amplitude spectrum is represented as:

$$2\tilde{\sigma}_0(t)=\tilde{u}_{pc}(t)+\tilde{v}_{pc}(t)+\tilde{u}_{pc}(-t)+\tilde{v}_{pc}(-t)$$

Wherein, the complex cepstrum of amplitude spectrum $\tilde{\sigma}_{pc}(t)$ is symmetrically displayed on the positive and negative axis of the complex cepstrum, $\tilde{v}_{pc}(-t)$ is the complex cepstrum of the minimum phase function corresponding to the minimum phase component $v_{pc}(t)$ of the seismic wavelet, $\tilde{u}_{pc}(-t)$ is the complex cepstrum of the maximum phase function corresponding to the maximum phase component $u_{pc}(t)$ of the seismic wavelet;

Based on the complex cepstrum of the amplitude spectrum, determine a set of mixed-phase wavelet sets with the same amplitude spectrum, adjust Yu wavelet parameters, and on the premise of ensuring the integrity of the main frequency of the seismic wavelet, increase the effective bandwidth to the preset bandwidth threshold to obtain the reshaped seismic waveform data.

In some preferred embodiments, the calculation method of the simulated seismic wavelet amplitude spectrum is:

Locating the maximum value of seismic signal amplitude spectrum in seismic wave reflection signal data and the frequency corresponding to the maximum value;

By fitting the maximum amplitude spectrum of the seismic signal and the simulated seismic wavelet amplitude spectrum through the least squares method, the coefficients of the parameter $\alpha$ and polynomial $H(f)$ are obtained, and the corresponding frequency amplitude values of the fitted maximum value are obtained;

Divide the maximum value of the seismic signal amplitude spectrum by the corresponding frequency amplitude value of the fitted maximum value, and then use the quotient to fit the coefficients of the polynomial $A(f)$.

In some preferred embodiments, based on the reshaped seismic waveform data;

Represent local plane waves as:

$$\frac{\partial u_{lpw}}{\partial x}+\theta_{lpw}\frac{\partial u_{lpw}}{\partial t_{lpw}}=0$$

Wherein, $u_{lpw}(x, t_{lpw})$ represents the wave field function, x represents the offset distance or horizontal distance, $\theta_{lpw}$ represents the local dip angle of the continuous spatiotemporal domain, and $t_{lpw}$ represents the time of the local plane wave;

The local plane wave solution operator is:

$$d_{res}=D*s_{sc}$$

Wherein, $d_{res}$ represents residual, $s_{sc}$ represents seismic channel, and D represents plane-wave destruction filter:

$$D=\begin{bmatrix} I & 0 & 0 & \cdots & 0 \\ -P_{1,2} & I & 0 & \cdots & 0 \\ 0 & -P_{2,3} & I & \cdots & 0 \\ \cdots & \cdots & \cdots & \ddots & \cdots \\ 0 & 0 & \cdots & -P_{N-1,N} & I \end{bmatrix}$$

Wherein, $P_{i,j}$ represents the prediction factor for the number of seismic channels from the i-th to the jth channel, which is a function of local dip angle, $\theta_{lpw}$ and I and $P_{i,j}$ are both M×1-dimensional matrix;

The local dip angle $\theta_{lpw}$ is estimated by minimizing the objective function of prediction error d:

$$\theta_{lpw}=argmin||D(\theta_{lpw})||_2^2+\xi_{reg}^2||S_{reg}[\theta_{lpw}]||_2^2$$

Wherein, $\xi_{reg}$ represents the regularization proportion coefficient and $S_{reg}$ represents the reshaping regularization operator.

In some preferred embodiments, the amplitude gradient image is obtained by:

Based on the enhanced seismic data, select a certain direction of a seismic sample point to search for the scrambling of amplitude vector, and construct the gradient structure tensor field T(s, v) expression as follows:

$$T(s,v) = \begin{bmatrix} \int D_x^2 SW_N(s,v) & \int D_x D_y SW_N(s,v) & \int D_x D_z SW_N(s,v) \\ \int D_x D_y SW_N(s,v) & \int D_y^2 SW_N(s,v) & \int D_y D_z SW_N(s,v) \\ \int D_x D_z SW_N(s,v) & \int D_y D_z SW_N(s,v) & \int D_z^2 SW_N(s,v) \end{bmatrix}$$

Wherein, the $D_x$, $D_y$ and $D_z$ respectively represent the change rate of seismic amplitude along x, y, z with time t, and $SW_N(s, v)$ represents the smoothing factor along azimuth v. The smoothing function is a multipoint Gaussian function;

After establishing the matrix in the s-direction, calculate the amplitude vector scrambling value as:

$$F(s,v) = \frac{3}{2} \frac{\lambda_2(s,v) + \lambda_3(s,v)}{\lambda_1(s,v) + \lambda_2(s,v) + \lambda_3(s,v)}$$

Wherein, $\lambda_1$, $\lambda_2$ and $\lambda_3$ are respectively the eigenvalues of the first structure tensor field, the second structure tensor field, and the third structure tensor field of the gradient structure tensor field T(s, v);

The scrambling values of the amplitude vector form an amplitude gradient image.

In some preferred embodiments, the method for obtaining the dip attribute data body includes:

Based on the enhanced seismic data, calculate the instantaneous wave velocity $K_x(x, y)$ in the horizontal direction and the instantaneous wave velocity $K_y(x, y)$ in the depth direction respectively:

$$K_x(x,y) = \frac{u(d^H u/dx) - u^H(du/dx)}{(u)^2 + (u^H)^2}$$

$$K_y(x,y) = \frac{u(d^H u/dy) - u^H(du/dy)}{(u)^2 + (u^H)^2}$$

Wherein, u is the input data, superscript H is the Hilbert operator, and d is the total differential;

Calculate the instantaneous dip angle θ based on the instantaneous wave velocity $K_x(x, y)$ the horizontal direction and the instantaneous wave velocity $K_y(x, y)$ in the depth direction:

θ=$tan^{-1}(k_x/k_y)$

The instantaneous dip angle constitutes a dip angle attribute image.

In some preferred embodiments, the gradient amplitude attribute fault confidence region is obtained by:

Set the value of points with attribute points below the preset fault threshold to 0, while keeping the values of other points unchanged;

Process the grid with attribute points higher than the preset fault threshold through the ellipsoidal expansion method to obtain the expanded fault position data volume;

Specifically:

In the process of ellipsoid expansion, the ellipsoid is raised to the required height Δ h along the direction of the mean curvature radius of the corresponding point P1 of the ground point P0 on the original ellipsoid E1, so that the ellipsoid coincides with the elevation projection plane;

Set $R_1$ as the mean curvature radius of P0 on the foundation ellipsoid E1, and $R_2$ as the mean curvature radius of P1 on the expanded engineering ellipsoid E2. The specific algorithm of $R_1$ and $R_2$ is:

$$\begin{cases} R_1 = \sqrt{M \cdot N} = a_1 \cdot \sqrt{1 - e^2/(1 - e^2 \sin^2 B_1)} \\ R_2 = R_1 + \Delta h = a_2 \cdot \sqrt{1 - e^2/(1 - e^2 \sin^2 B_2)} \end{cases}$$

M and N represent the meridian radius of curvature of the original ellipsoid E1 and the radius of curvature of the prime vertical, $\alpha_1$ and $\alpha_2$ respectively represent the long half-axis of the foundation ellipsoid E1 and the long half-axis of the expanded engineering ellipsoid E2, e represent the first eccentricity of the ellipsoid, $B_1$ and B2 respectively represent the geodetic dimensions of the reference point on the foundation ellipsoid E1 and the expanded engineering ellipsoid E2;

Wherein:

$$\begin{cases} a_1 = R_1 \cdot (1 - e^2 \sin^2 B_1)/\sqrt{1 - e^2} \\ a_2 = R_2 \cdot \frac{(1 - e^2 \sin^2 B_2)}{\sqrt{1 - e^2}} = (R_1 + \Delta h) \cdot (1 - e^2 \sin^2 B_2) \end{cases}$$

Due to the dense data points and linear shape of the fault data group, the dimensional changes after expansion are negligible, and $B_1 \approx B_2$, or the variable da of the long half-axis is:

da=$\alpha_2 - \alpha_1 \approx \Delta h \cdot ((1 - e^2 \sin^2 B_1)/\sqrt{1 - e^2})$ Calculate the amount of change in the long half-axis to obtain the change in the volume of the ellipsoid. The position of the ellipsoid after the volume change is the position of the attribute point after expansion, and the value of the expanded range of data points is the average value of the data group. Obtain the confidence region of the gradient amplitude attribute fault.

In some preferred embodiments, the hierarchical wavelet transform method is used for image fusion, specifically:

Divide the gradient amplitude attribute fault confidence region and the dip angle attribute data volume defining the fault position into high-frequency images and low-frequency images through preset frequency boundary values;

Based on the high-frequency image, define the local Log Gabor energy $LG_f(x, y)$ of the window at any point in the high-frequency image (x, y) as:

$$LG_f(x,y) = \frac{1}{M \times N} \sum_{m=1}^{M} \sum_{n=1}^{N} T_f\left(x + m - \frac{M+1}{2}, y + n - \frac{N+1}{2}\right)$$

Wherein, M×N represents the size of the local neighborhood window and $T_f$ represents the Log Gabor energy value of the current image f at (x, y);

The high-frequency fusion rules are:

$$LG_{Hi}^A(x,y) = \frac{1}{M \times N} \sum_{m=1}^{M} \sum_{n=1}^{N} T_H^A\left(x + m - \frac{M+1}{2}, y + n - \frac{N+1}{2}\right)$$

-continued $$LG_{Hi}^B(x, y) = \frac{1}{M \times N} \sum_{m=1}^{M} \sum_{n=1}^{N} T_H^B\left(x + m - \frac{M+1}{2}, y + n - \frac{N+1}{2}\right)$$

Wherein, $$T_H^A\left(x + m - \frac{M+1}{2}, y + n - \frac{N+1}{2}\right)$$

is the Log-Gabor energy value of the gradient amplitude attribute at $$\left(x + m - \frac{M+1}{2}, y + n - \frac{N+1}{2}\right),$$

$LG_{Hi}^A(x, y)$ denotes the evaluated Log-Gabor energy value of the high-frequency image of the gradient amplitude attribute fault confidence region in the local neighborhood M×N $$T_H^B\left(x + m - \frac{M+1}{2}, y + n - \frac{N+1}{2}\right)$$

is the Log-Gabor energy value of the dip angle attribute at $$\left(x + m - \frac{M+1}{2}, y + n - \frac{N+1}{2}\right), \left(x + m - \frac{M+1}{2}, y + n - \frac{N+1}{2}\right).$$

denotes the evaluated Log-Gabor energy value of the high-frequency image in of the dip angle attribute data volume at (x, y) in the local neighborhood window M×N;

The high-frequency component of the fused image is FHi, and the fusion coefficient is the coefficient with the larger local Log Gabor energy:

$$F_H(x, y) = \begin{cases} A_{Hi}(x, y), & LG_{Hi}^A(x, y) \geq LG_{Hi}^B(x, y) \\ LG_{Hi}^B(x, y), & LG_{Hi}^A(x, y) < LG_{Hi}^B(x, y) \end{cases}$$

Wherein, $A_{Hi}$ is the value of the gradient amplitude attribute at (x, y), $F_H(x, y)$ denotes the Log-Gabor value of the high-frequency component of the fused image at (x, y);

Based on the low-frequency image, compare the pixel points of the low-frequency image in the confidence region of the gradient amplitude attribute fault with the pixel points of the low-frequency image in the dip attribute data volume one by one to obtain a weight map $W_1$, $W_2$:

$$W_1 = \begin{cases} 1, & A_1 > A_2 \\ 0, & \text{else} \end{cases}$$

$$W_2 = \begin{cases} 1, & A_2 > A_1 \\ 0, & \text{else} \end{cases}$$

Wherein, $A_1$ is the pixel point value of the low frequency image of the gradient amplitude attribute fault confidence region. $A_2$ is the pixel point value of the low frequency image of the dip angle attribute data volume.

Weighted fusion is performed on the weight map to obtain the processed low-frequency image A:

$$A = \frac{W_1 \times A_1 + W_2 \times A_2}{W_1 + W_2}$$

Combine the Log Gabor energy values of the high-frequency components of the fused image at (x, y) with the processed low-frequency image A to obtain a superimposed fault attribute map.

In some preferred embodiments, the center point position of the bead-like structure is obtained by:

Based on the superimposed fault attribute map, the average coordinates of each point are obtained to obtain the center position ($\bar{x}$, $\bar{y}$, $\bar{z}$) of the bead-like structure:

$$\bar{x} = \frac{\sum_1^n x_i}{n}$$

$$\bar{y} = \frac{\sum_1^n y_i}{n}$$

$$\bar{z} = \frac{\sum_1^n y_i}{n}$$

Wherein, $X_i$, $Y_i$ and $Z_i$ represent the coordinate values of the three directions of the data points, and n represents the number of data points.

The second aspect of the present invention provides a fault characterization system for precise navigation of deep oil and gas based on image fusion, which includes:

The seismic data pre-processing module is configured to acquire the original seismic data, conduct spectral shaping on the original seismic data to obtain the reshaped seismic waveform data, and conduct diffusion filtering and dip filtering on the reshaped seismic waveform data to obtain enhanced seismic data; The order of diffusion filtering and dip filtering can be swapped;

The amplitude gradient image acquisition module is configured to obtain the amplitude gradient image by calculating the amplitude gradient vector;

The dip attribute image acquisition module calculates the dip attribute image based on the enhanced seismic data;

The gradient amplitude attribute fault confidence region acquisition module is configured to obtain the gradient amplitude attribute fault confidence region through the ellipsoidal expansion method;

The dip attribute data volume acquisition module for defining the fault position is configured to multiply the dip attribute image with the confidence region of the fault irregularly to obtain the dip attribute data volume for defining the fault position;

The image fusion module is configured to fuse the gradient amplitude attribute fault confidence region with the dip angle attribute data volume that defines the fault position through a hierarchical wavelet transform method to obtain a superimposed fault attribute map;

The branch fault scoring module is configured based on the superimposed fault attribute map, dividing the bead-like structure; Based on the center point position of the bead-like structure, the number of bead data points within the set bead distance range is recorded as the score of branch fault data points;

The fault area analysis module is configured to determine whether the score of the branch fault data point is greater than the preset dominant fault score threshold, identify the part that is greater than the preset dominant fault score threshold as the dominant fault area, and identify the part that is less than the preset advantage fault score threshold as the non-dominant fault area;

The scale replacement module is configured to set different bead distance ranges, and repeat the content of the branch fault scoring module and fault area analysis module to obtain graded dominant fault areas.

The beneficial effects of the invention:

(1) The dip angle attribute in the present invention reflects changes in the dip angle of the formation and has a significant effect on characterizing small fault spacing advantageous sections. The dip attribute is greatly affected by the quality of the data, and after dip filtering, noise interference can be greatly improved.

(2) The amplitude gradient attribute in the invention can clearly show the main fault of Craton basin fault. Moreover, the interference from non-fault factors is minimal, and the accurate location of the fault can be determined.

(3) The present invention utilizes image fusion techniques such as wavelet transform, ellipsoidal dilation, high and low-frequency fusion, etc. to fuse the dip attribute and amplitude gradient attribute into a new attribute, while possessing the advantages of both: determining the accurate location of faults and displaying a large amount of detailed information.

(4) Based on the combination of geology and geophysics, the invention uses image fusion technology, seismic attribute, and other technologies to extract favorable information about the seismic data of the same target collected by multiple source channels to the maximum extent, and finally synthesize it into high-quality images, to improve the utilization rate of image information and the interpretation accuracy and reliability. The crack prediction results obtained using this method have significant guiding significance for the study of fault modes and oil and gas production, improving the accuracy of deep oil and gas exploration and navigation.

BRIEF DESCRIPTION OF DRAWINGS

By reading the detailed description of non-limiting embodiments concerning the following figures, the other features, objectives, and advantages of this application will become more apparent.

DETAILED DESCRIPTION OF THE EMBODIMENTS

The following will provide a further detailed explanation of the present application in conjunction with the figures and embodiments. It can be understood that the specific embodiments described here are only used to explain the relevant invention and not to limit it. Furthermore, it should be noted that for the convenience of description, only the parts related to the relevant invention are shown in the figures.

It should be noted that in the absence of conflicts, the embodiments and the features in the embodiments in this application can be combined. The present application will be explained in detail below concerning the figures and in conjunction with embodiments.

Figure 1:
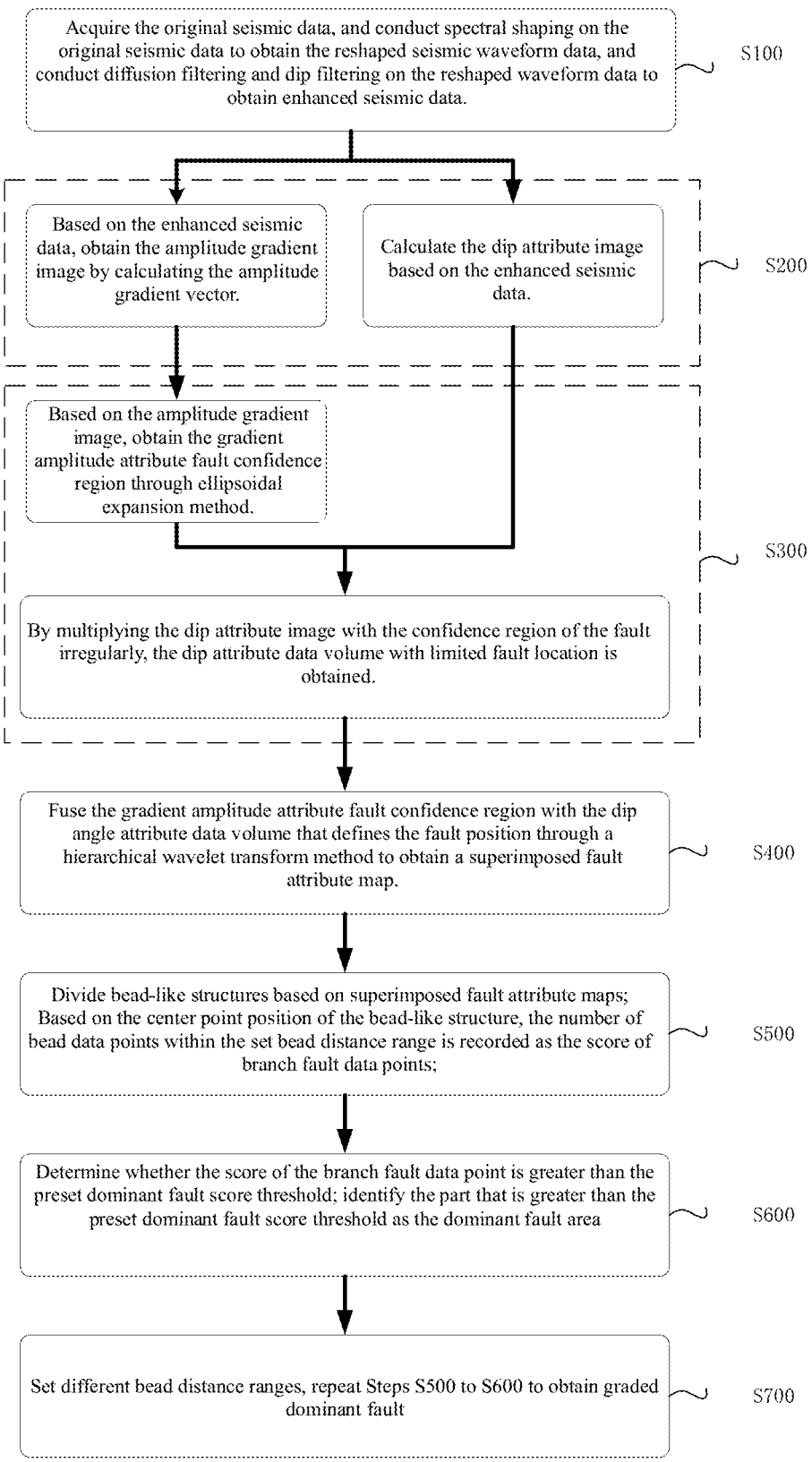
FIG. 1 is a flowchart of a fault characterization method for precise navigation of deep oil and gas based on image fusion in the first embodiment of the present invention.

To provide a clearer explanation of the fault characterization method for precise navigation of deep oil and gas based on image fusion of the present invention, the following steps in the embodiments of the present invention are detailed in conjunction with FIG. 1.

Figure 2:
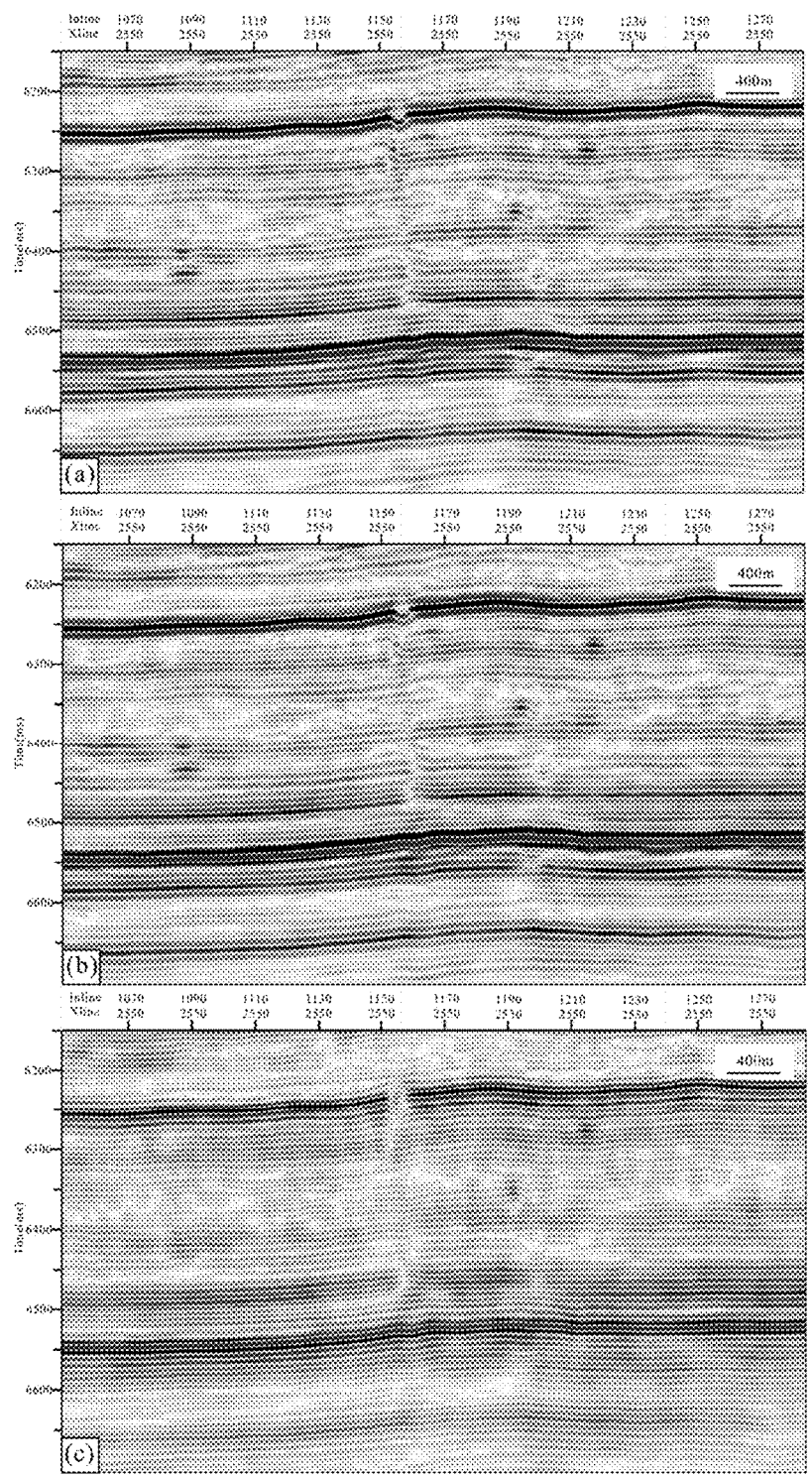
FIG. 2 is a schematic diagram of the effect comparison of the original seismic data, the reshaped seismic waveform data, and the enhanced seismic data in the first embodiment of the invention.

The first embodiment of the present invention is a fault characterization method for precise navigation of deep oil and gas based on image fusion, which includes steps S100 to S700, and each step is described in detail as follows:

Step S100, acquires the original seismic data, conducts spectral shaping on the original seismic data to obtain the reshaped seismic waveform data, and conducts diffusion filtering and dip filtering on the reshaped seismic waveform data to obtain enhanced seismic data; The order of diffusion filtering and dip filtering can be swapped. The raw seismic data collected is shown in FIG. 2(a).

The original seismic data in this embodiment uses a 3D survey grid with a 15 m×15 m trace spacing. The seismic signal is composed of seismic wave amplitude data points with a sampling interval of 2 ms, and the total sampling time is 6 ms.

The geology of Craton has a stable internal structure and weak activity. The secondary activity of pre-existing structures often develops deep faults with short displacement and small fault displacement. Oil and gas exploration in Craton basin shows that the development of deep carbonate rock reservoirs is controlled by the internal faults of Craton, exhibiting a enrichment mode of "near source fault control". Due to the low vertical and horizontal resolution and deep signal-to-noise ratio of earthquakes, conventional seismic interpretation is difficult to accurately depict complex faults, resulting in many controversies over their tectonic evolution and formation mechanisms.

This embodiment is proposed based on existing technology to identify deep strike-slip faults with short displacement and small fault distance.

In this embodiment, dip-guided filtering is often effective for the fine identification of faults, especially in the seismic data with low signal-to-noise ratio and developed fault zones similar to those in the working area. The continuity of the same phase axis in the original seismic profile is poor without fault dislocation. The noise contained in the seismic data after structure-guided filtering is significantly reduced compared to the noise contained in the original seismic record. Not only is the continuity of the same phase axis enhanced, but discontinuity features such as fault breakpoints are also clearly preserved.

In this embodiment, the spectral shaping includes:

The original seismic data includes a seismic record convolution model, which is represented in the frequency domain as:

$$s_{swa}(\omega)=\sigma(\omega)\xi_{fl}(\omega)$$

Wherein, $s_{swa}(\omega)$ represents the seismic record after Fourier transform, $\sigma(\omega)$ represents the seismic wavelet after Fourier transform, $\xi_{fl}(\omega)$ represents the spectrum of reflection coefficient after Fourier transform, and $\omega$ represents the angular frequency;

Take the logarithm on both sides of the representation of the convolution model in the frequency domain to obtain the representation of the linear system of seismic records in the frequency domain:

$$ln s_{swa}(\omega)=ln\sigma(\omega)+ln\xi_{fl}(\omega)$$

Wherein, $Ins_{swa}(\omega)$ represents the linear system frequency domain representation of seismic record, $In\sigma(107)$ represents the linear system frequency domain representation of seismic wavelet, $In\xi_{fl}(107)$ and represents the linear system frequency domain representation of reflection coefficient;

Carry out inverse Fourier transform on the frequency domain representation of the linear system of the seismic record to obtain the complex cepstrum sequence of the seismic record spectrum:

$$\tilde{s}_{swa}(t_{swa})=\tilde{\sigma}(t_{swa})+\tilde{\xi}_{fl}(t_{swa})$$

Wherein, $\tilde{s}_{swa}(t_{swa})$ represents the complex cepstrum sequence of seismic waveform record, $\tilde{\sigma}(t_{swa})$ represents the complex cepstrum sequence of seismic wavelet, $\tilde{\xi}_{fl}(t_{swa})$ represents the complex cepstrum sequence of stratum reflection coefficient, and $t_{swa}$ represents the arrival time of seismic wave;

The wavelet complex cepstrum sequence and reflection coefficient complex cepstrum sequence in the complex cepstrum are separated by a low-pass filter, and the wavelet amplitude is extracted;

Based on the wavelet amplitude, simulate the seismic wavelet amplitude spectrum using the least squares method:

$$\sigma(f)=A(f)f^{\alpha}e^{H(f)}$$

Wherein, the least squares fitting parameter $\alpha \geq 0$ a is a constant, $\sigma(f)$ represents the wavelet amplitude spectrum, $H(f)$ and $A(f)$ represent the polynomials of f, f represents the frequency of seismic wavelet, and e represents the base number of natural logarithm;

In this embodiment, the calculation method for simulating the seismic wavelet amplitude spectrum is as follows:

Locating the maximum value of seismic signal amplitude spectrum in seismic wave reflection signal data and the frequency corresponding to the maximum value;

By fitting the maximum amplitude spectrum of the seismic signal and the simulated seismic wavelet amplitude spectrum through the least squares method, the coefficients of the parameter $\alpha$ and polynomial $H(f)$ are obtained, and the corresponding frequency amplitude values of the fitted maximum value are obtained;

Divide the maximum value of the seismic signal amplitude spectrum by the corresponding frequency amplitude value of the fitted maximum value, and then use the quotient to fit the coefficients of the polynomial $A(f)$;

Based on the amplitude spectrum of the simulated seismic wavelet, the maximum phase component and minimum phase component of the wavelet are obtained;

If the maximum phase component of the wavelet $\sigma(t)$ is $u_{pc}(t)$, and the minimum phase component of the wavelet is $v_{pc}(t)$, then the $\sigma(t)$ of the wavelet is:

$$\sigma(t)=u_{pc}(t) \cdot v_{pc}(t)$$

Wherein, the wavelet $\sigma(t)$ is the amplitude spectrum; $u_{pc}(t)$ is the maximum phase component; $v_{pc}(t)$ is the Minimum phase component;

The complex cepstrum of the amplitude spectrum is represented as:

$$2\tilde{\sigma}_0(t)=\tilde{u}_{pc}(t)+\tilde{v}_{pc}(t)+\tilde{u}_{pc}(-t)+\tilde{v}_{pc}(-t)$$

Wherein, the complex cepstrum of amplitude spectrum $\tilde{\sigma}_0(t)$ is symmetrically displayed on the positive and negative axis of the complex cepstrum, $\tilde{v}_{pc}(-t)$ is the complex cepstrum of the minimum phase function corresponding to the minimum phase component $v_{pc}(t)$ of the seismic wavelet, $\tilde{u}_{pc}(-t)$ is the complex cepstrum of the maximum phase function corresponding to the maximum phase component $u_{pc}(t)$ of the seismic wavelet;

Based on the complex cepstrum of the amplitude spectrum, determine a set of mixed-phase wavelet sets with the same amplitude spectrum, adjust Yu wavelet parameters, and on the premise of ensuring the integrity of the main frequency of the seismic wavelet, increase the effective bandwidth to the preset bandwidth threshold to obtain the reshaped seismic waveform data. The seismic waveform data after shaping is shown in FIG. 2(b).

Continuously adjust the parameters of Yu's wavelet to maintain low-frequency, expand high frequency, and appropriately increase the main frequency to construct the desired output wavelet shape. Under well-log curve monitoring, the signal-to-noise ratio spectrum is used as a reference to find the best balance point between improving resolution and fidelity.

After spectral shaping, the effective frequency band of seismic data has been expanded, and the high-frequency part has been reasonably strengthened. On the seismic waveform, the number of events in the same phase increases, which is easier to reflect the detailed changes of seismic wave reflection information, and improve the consistency of the waveform of the same reflection wave group in terms of amplitude, phase, and frequency.

Spectral shaping is a data processing method that improves the resolution of seismic signals by expanding effective frequency bands while ensuring the high fidelity of processed seismic data.

In this embodiment, the dip filtering is specifically:
Based on the reshaped seismic waveform data;
Represent local plane waves as:

$$\frac{\partial u_{lpw}}{\partial x}+\theta_{lpw}\frac{\partial u_{lpw}}{\partial t_{lpw}}=0$$

Wherein, $u_{lpw}(x, t_{lpw})$ represents the wave field function, x represents the offset distance or horizontal distance, $\theta_{lpw}$ represents the local dip angle of the continuous spatiotemporal domain, and $t_{lpw}$ represents the time of the local plane wave;

When the dip angle of the local layer changes along the spatiotemporal direction, local operators can be used to predict adjacent seismic channels.

In the linear operator representation, the local plane wave solution operator is:

$$d_{res}=D*s_{sc}$$

Wherein, $d_{res}$ represents residual, $s_{sc}$ represents seismic channel, and D represents plane-wave destruction filter:

$$D = \begin{bmatrix} I & 0 & 0 & \ldots & 0 \\ -P_{1,2} & I & 0 & \ldots & 0 \\ 0 & -P_{2,3} & I & \ldots & 0 \\ \ldots & \ldots & \ldots & \ddots & \ldots \\ 0 & 0 & \ldots & -P_{N-1,N} & I \end{bmatrix}$$

Wherein, $P_{i,j}$ represents the prediction factor for the number of seismic channels from the i-th to the jth channel, which is a function of local dip angle, $\theta_{lpw}$ and I and $P_{i,j}$ are both M×1-dimensional matrix;

The local dip angle $\theta_{lpw}$ is estimated by minimizing the objective function of prediction error d:

$$\theta_{lpw} = argmin \ \|D(\theta_{lpw})\|_2^{2+\xi_{reg}^2} \|s_{reg}[\theta_{lpw}]\|_2^2$$

Wherein, $\xi_{reg}$ represents the regularization proportion coefficient and $s_{reg}$ represents the reshaping regularization operator.

The dip angle guidance can directly generate guidance bodies, which contain the dip and azimuth information of each sampling point in space. During multi-channel attribute processing and filtering, guidance bodies are used to represent the spatial distribution of geological targets, thereby improving the accuracy of target and fault detection.

The seismic profile after spectral shaping, diffusion filtering, and dip filtering are shown in FIG. 2(c).

Step S200, based on the enhanced seismic data, obtains the amplitude gradient image by calculating the amplitude gradient vector;

The core idea of a crack prediction method based on amplitude gradient vector scrambling value detection is to assume that the fault surface is a surface in a local area. By searching for the scrambling of the seismic amplitude gradient vector at various azimuth and dip angles in three-dimensional space, the most scrambling surface is identified as the fault location. The obtained amplitude gradient image can provide an approximate location of the fault but lacks detailed information and contains insufficient contents.

In this embodiment, the amplitude gradient image is obtained by:

The amplitude gradient image is obtained by:

Based on the enhanced seismic data, select a direction of a seismic sample point to search for the scrambling value of the amplitude vector, and construct the gradient structure tensor field T(s, v) expression as follows:

$$T(s,v) = \begin{bmatrix} \int D_x^2 SW_N(s,v) & \int D_x D_y SW_N(s,v) & \int D_x D_z SW_N(s,v) \\ \int D_x D_y SW_N(s,v) & \int D_y^2 SW_N(s,v) & \int D_y D_z SW_N(s,v) \\ \int D_x D_z SW_N(s,v) & \int D_y D_z SW_N(s,v) & \int D_z^2 SW_N(s,v) \end{bmatrix}$$

Wherein, the $D_x$, $D_y$ and $D_z$ respectively represent the change rate of seismic amplitude along x, y, and z with time t, and $SW_N(s, v)$ represents the smoothing factor along azimuth v. The smoothing function is a multipoint Gaussian function;

After establishing the matrix in the s-direction, calculate the amplitude vector scrambling value as:

$$F(s,v) = \frac{3}{2} \frac{\lambda_2(s,v) + \lambda_3(s,v)}{\lambda_1(s,v) + \lambda_2(s,v) + \lambda_3(s,v)}$$

Wherein, $\lambda_1$, $\lambda_2$ and $\lambda_3$ are respectively the eigenvalues of the first structure tensor field, the second structure tensor field, and the third structure tensor field of the gradient structure tensor field T(s, v).

Figure 3:
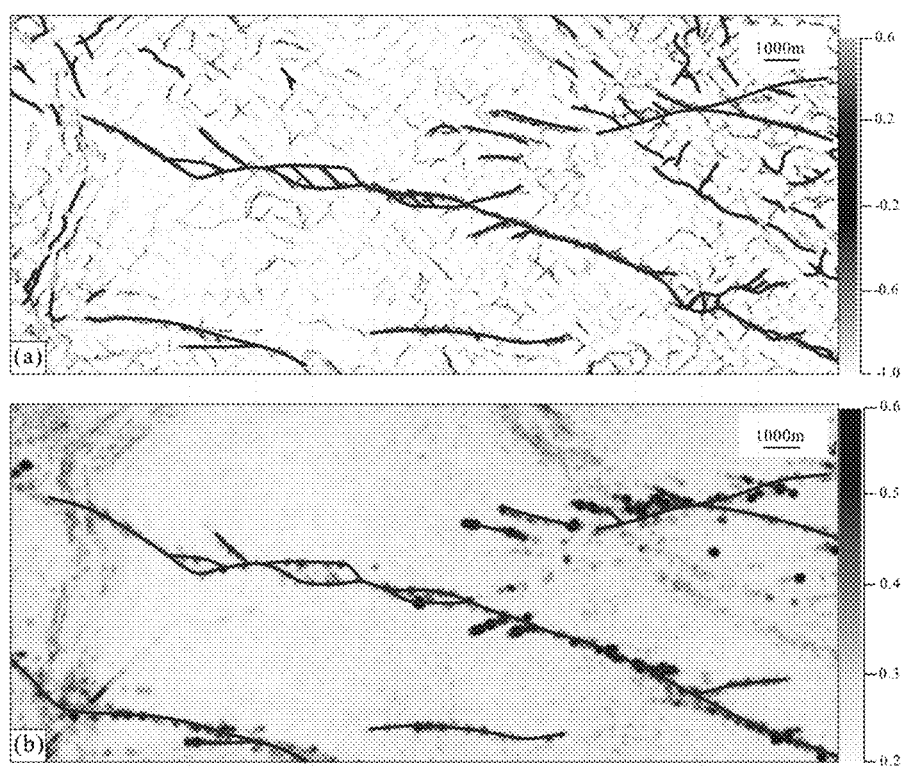
FIG. 3 is a schematic diagram of the effect comparison between the amplitude gradient attribute image and the dip attribute image in the first embodiment of the present invention.

The scrambling values of the amplitude vector form an amplitude gradient image. The obtained amplitude gradient image is shown in FIG. 3(a).

Calculate the dip attribute image based on the enhanced seismic data;

The method for obtaining the dip attribute number image includes:

Based on the enhanced seismic data, calculate the instantaneous wave velocity $K_x(x, y)$ in the horizontal direction and the instantaneous wave velocity $K_y(x, y)$ in the depth direction respectively:

$$K_x(x,y) = \frac{u(d^H u/dx) - u^H(du/dx)}{(u)^2 + (u^H)^2}$$

$$K_y(x,y) = \frac{u(d^H u/dy) - u^H(du/dy)}{(u)^2 + (u^H)^2}$$

Wherein, u is the input data, superscript H is the Hilbert operator, and d is the total differential;

Calculate the instantaneous dip angle θ based on the instantaneous wave velocity $K_x(x, v)$ in the horizontal direction and the instantaneous wave velocity $K_y(x, y)$ in the depth direction:

$$\theta = tan^{-1}(k_x/k_y)$$

The instantaneous dip angle constitutes a dip angle attribute image. Based on the obtained dip angle attribute image, it can be seen that the main fault is clearer, and more details of the identified fault are identified. Branch faults are more chaotic, and although several major branch faults can be seen, the overall shape is a network, severely affected by false faults, and it is difficult to distinguish true from false.

The obtained dip attribute image is shown in FIG. 3(b);

In this embodiment, both the amplitude gradient attribute image and the dip attribute image have their advantages and disadvantages. However, due to the different properties of the images, they cannot be simply concatenated or overlaid for data analysis. This application compensates for each other's shortcomings and improves the accuracy of the analysis by fusing the two images.

Figure 4:
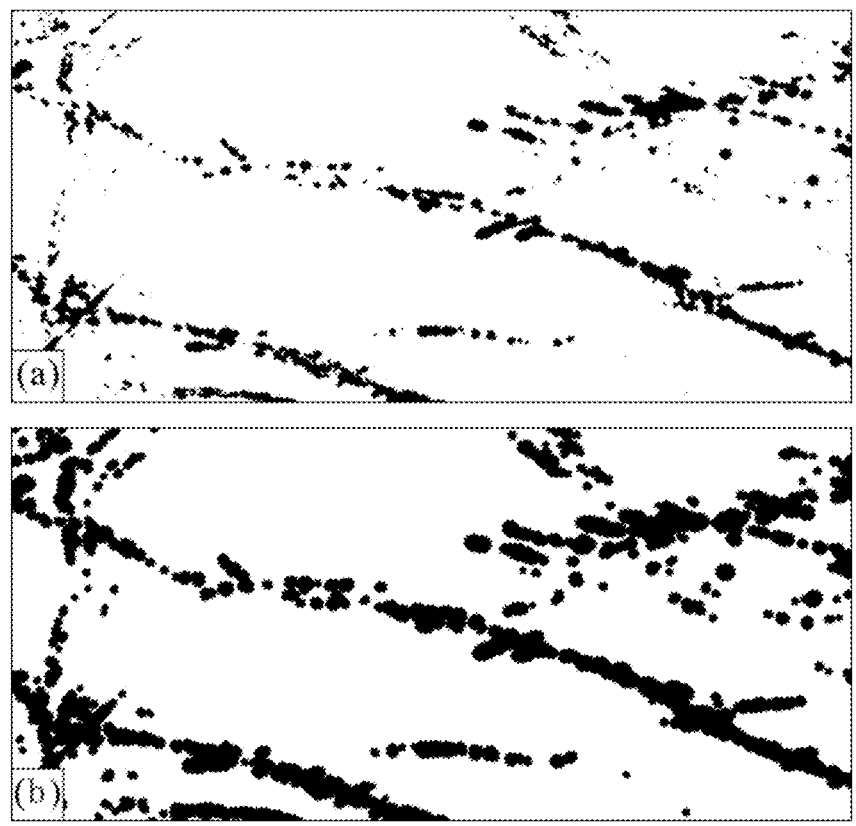
FIG. 4 is a schematic diagram of the effect comparison before and after generating the gradient amplitude attribute fault confidence region in the first embodiment of the present invention.

Step S300, based on the amplitude gradient image, obtains the gradient amplitude attribute fault confidence region through the ellipsoidal expansion method;

In this embodiment, the gradient amplitude attribute fault confidence region is obtained by:

Set the value of points with attribute points below the preset fault threshold to 0, while keeping the values of other points unchanged. The spatial range obtained after numerical adjustment is shown in FIG. 4(a);

Process the grid with attribute points higher than the preset fault threshold through the ellipsoidal expansion method to obtain the expanded fault position data volume; Specifically:

In the process of ellipsoid expansion, the ellipsoid is raised to the required height Δ h along the direction of the mean curvature radius of the corresponding point P1 of the ground point P0 on the original ellipsoid E1, so that the ellipsoid coincides with the elevation projection plane. The projection point of P1 point on the horizontal plane where the lowest point in the connected data group with numerical values is located;

Set $R_1$ as the mean curvature radius of P0 on the foundation ellipsoid E1, and $R_2$ as the mean curvature radius of P1 on the expanded engineering ellipsoid $E_2$. The specific algorithm of $R_1$ and $R_2$ is:

$$\begin{cases} R_1 = \sqrt{M \cdot N} = a_1 \cdot \sqrt{1 - e^2 / (1 - e^2 \sin^2 B_1)} \\ R_2 = R_1 + \Delta h = a_2 \cdot \sqrt{1 - e^2 / (1 - e^2 \sin^2 B_2)} \end{cases}$$

M and N represent the meridian radius of curvature of the original ellipsoid E1 and the radius of curvature of the prime vertical, $a_1$ and $a_2$ respectively represent the long half-axis of the foundation ellipsoid E1 and the long half-axis of the expanded engineering ellipsoid E2, e represent the first eccentricity of the ellipsoid, $B_1$ and $B_2$ respectively represent the geodetic dimensions of the reference point on the foundation ellipsoid $E_1$ and the expanded engineering ellipsoid $E_2$;

Wherein:

$$\begin{cases} a_1 = R_1 \cdot (1 - e^2 \sin^2 B_1) / \sqrt{1 - e^2} \\ a_2 = R_2 \cdot \dfrac{(1 - e^2 \sin^2 B_2)}{\sqrt{1 - e^2}} = (R_1 + \Delta h) \cdot (1 - e^2 \sin^2 B_2) \end{cases}$$

Due to the dense data points and linear shape of the fault data group, the dimensional changes after expansion are negligible, and $B_1 \approx B_2$, or the variable da of the long half-axis is:

$$da = a_2 - a_1 \approx \Delta h \cdot ((1 - e^2 \sin^2 B_1) / \sqrt{1 - e^2}$$

Calculate the amount of change in the long half-axis to obtain the change in the volume of the ellipsoid. The position of the ellipsoid after the volume change is the position of the attribute point after expansion, and the value of the expanded range of data points is the average value of the data group. Obtain the confidence region of the gradient amplitude attribute fault. The obtained gradient amplitude attribute fault confidence region is shown in FIG. 4(b).

Due to the anisotropy of the ellipsoid surface, the original normal after expansion may not necessarily be perpendicular to the new ellipsoid surface. By setting structural units, the range of extracted attribute points can be expanded based on geological theory, thereby obtaining the fault location data volume. In existing images, if the fusion is not carried out without ellipsoidal expansion of the amplitude gradient image, it will result in the image having no connectivity and cannot be analyzed. Furthermore, although the amplitude gradient image can determine accurate fault positions, it still cannot obtain all fault positions. By using ellipsoidal expansion, the data points can cover all fault positions, although it reduces some accuracy. However, the expanded image contains more valuable fault information, which cannot be accurately obtained from the dip attribute image, and the reduced accuracy can be compensated for by the information related to the dip attribute image.

By multiplying the dip attribute image with the confidence region of the fault irregularly, the dip attribute data volume with limited fault location is obtained;

Step S400, fuses the gradient amplitude attribute fault confidence region with the dip angle attribute data volume that defines the fault position through a hierarchical wavelet transform method to obtain a superimposed fault attribute map;

High-frequency images contain important detail information such as edges, noise, and textures. Suitable fusion rules are selected for specific fusion requirements. Gabor filters are widely used due to their scale invariance, and the algorithm in this paper extracts image features more completely. The Log Gabor filter can freely change the scale and be improved based on the Gabor filter, which can be effectively applied to high-frequency components and reduce redundancy. Local Log Gabor energy can effectively represent texture features, which is more important in processing the details of remote sensing images. Low-frequency images contain the main body information and most of the energy values of the image, and the selection rules are based on this as the standard. In the literature, guided filtering preserves edges and has low complexity. Based on this, weighted fusion based on guided filtering can align edges while filtering out noise.

The hierarchical wavelet transform method is used for image fusion, specifically:

Divide the gradient amplitude attribute fault confidence region and the dip angle attribute data volume defining the fault position into high-frequency images and low-frequency images through preset frequency boundary values;

Based on the high-frequency image, define the local Log Gabor energy $LG_f(x, y)$ of the window at any point in the high-frequency image (x, y) as:

$$LG_f(x, y) = \frac{1}{M \times N} \sum_{m=1}^{M} \sum_{n=1}^{N} T_f\left(x + m - \frac{M+1}{2}, y + n - \frac{N+1}{2}\right)$$

Wherein, M×N represents the size of the local neighborhood window and $T_f$ represents the Log Gabor energy value of the current image f at (x, y);

The high-frequency fusion rules are:

$$LG_{Hi}^A(x, y) = \frac{1}{M \times N} \sum_{m=1}^{M} \sum_{n=1}^{N} T_H^A\left(x + m - \frac{M+1}{2}, y + n - \frac{N+1}{2}\right)$$

$$LG_{Hi}^B(x, y) = \frac{1}{M \times N} \sum_{m=1}^{M} \sum_{n=1}^{N} T_H^B\left(x + m - \frac{M+1}{2}, y + n - \frac{N+1}{2}\right)$$

Wherein, $$T_H^A\left(x + m - \frac{M+1}{2}, y + n - \frac{N+1}{2}\right)$$

is the Log-Gabor energy value of the gradient amplitude attribute at $$\left(x + m - \frac{M+1}{2}, y + n - \frac{N+1}{2}\right),$$

$LG_{Hi}^A(x, y)$ denotes the evaluated Log-Gabor energy value of the high-frequency image of the gradient amplitude attribute fault confidence region in the local neighborhood M×N, $$T_H^B\left(x+m-\frac{M+1}{2}, y+n-\frac{N+1}{2}\right)$$

is the Log-Gabor energy value of the dip angle attribute at $$\left(x+m-\frac{M+1}{2}, y+n-\frac{N+1}{2}\right), \left(x+m-\frac{M+1}{2}, y+n-\frac{N+1}{2}\right).$$

denotes the evaluated Log-Gabor energy value of the high-frequency image of the dip angle attribute data volume (x, y) in the local neighborhood window M×N;

The high-frequency component of the fused image is FHi, and the fusion coefficient is the coefficient with the larger local Log Gabor energy:

$$F_H(x, y) = \begin{cases} A_{Hi}(x, y), & LG_{Hi}^A(x, y) \geq LG_{Hi}^B(x, y) \\ LG_{Hi}^B(x, y), & LG_{Hi}^A(x, y) < LG_{Hi}^B(x, y) \end{cases}$$

Wherein $A_{Hi}$ is the value of the gradient amplitude attribute at $F_H(x, y)$ denotes the Log-Gabor energy value of the high-frequency component of the fused image at (x, y);

Based on the low-frequency image, compare the pixel points of the low-frequency image in the confidence region of the gradient amplitude attribute fault with the pixel points of the low-frequency image in the dip attribute data volume one by one to obtain a weight map $w_1$, $w_2$:

$$W_1 = \begin{cases} 1, & A_1 > A_2 \\ 0, & else \end{cases}$$

$$W_2 = \begin{cases} 1, & A_2 > A_1 \\ 0, & else \end{cases}$$

Wherein, $A_1$ is the pixel point value of the low frequency image of the gradient amplitude attribute fault confidence region. $A_2$ is the pixel point value of the low frequency image of the dip angle attribute data volume.

Weighted fusion is performed on the weight map to obtain the processed low-frequency image A:

$$A = \frac{W_1 \times A_1 + W_2 \times A_2}{W_1 + W_2}$$

Figure 5:
FIG. 5 is a superimposed fault attribute diagram in the first embodiment of the present invention.

Combine the Log Gabor energy values of the high-frequency components of the fused image at (x, y) with the processed low-frequency image A to obtain a superimposed fault attribute map. The superimposed fault attribute diagram is shown in FIG. 5.

The present invention utilizes low-frequency fusion to display the main faults in the superimposed fault attribute map, and high-frequency fusion to display the branch faults in the superimposed fault attribute map, resulting in a superimposed fault attribute map that displays details in various situations.

In this embodiment, the obtained dip angle attribute image can reflect changes in the dip angle of the formation and has a significant effect on characterizing small fault spacing advantageous sections. However, the dip attribute is greatly affected by the quality of the data, and after dip filtering, noise interference can be greatly improved. The amplitude gradient image can clearly show the main fault of Craton basin fault. Moreover, the interference from non-fault factors is minimal, and the accurate location of the fault can be determined.

To combine attribute images and amplitude gradient images, image fusion techniques such as wavelet transform, ellipsoidal dilation, and high-frequency and low-frequency fusion are used to fuse the dip and amplitude gradient attributes into a new attribute called superimposed fault attribute, achieving the advantages of both: determining the accurate location of the fault, displaying a large amount of detailed information, and compensating for each other's shortcomings.

Step S500, based on the superimposed fault attribute map, divides the bead-like structure;

Based on the center point position of the bead-like structure, the number of bead data points within the set bead distance range is recorded as the score of branch fault data points. Three-dimensional sculpting of bead-like structures in seismic data volumes is achieved manually with Petrol software. The coordinates of each point in the data volume are averaged to obtain the Centroid coordinates of each string of beads, : ($\bar{x}$, $\bar{y}$, $\bar{z}$), wherein:

$$\bar{x} = \frac{\sum_1^n x_i}{n}, \bar{y} = \frac{\sum_1^n y_i}{n}, \bar{z} = \frac{\sum_1^n z_i}{n}$$

$x_i$, $y_i$, and $z_i$ are coordinate values in three directions for data points, with a total of n data points. $\bar{x}$, $\bar{y}$, and $\bar{z}$ are average coordinate values of n data in three directions.

The score of the branch fault data point reflects the matching relationship between the branch fault and the bead sequence. The larger the score of the data point, the more it matches the bead sequence; the smaller the score of the data point, the less it matches the bead.

Figure 6:
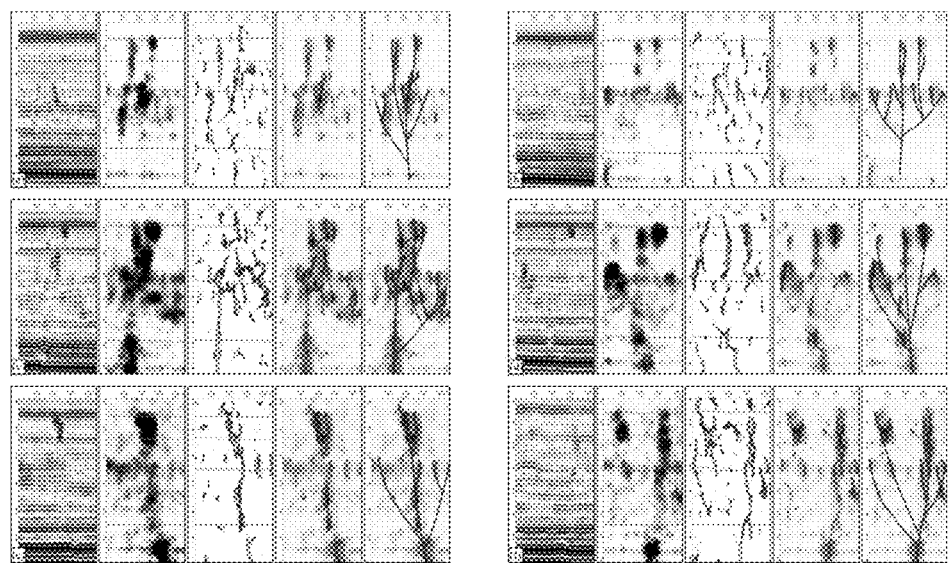
FIG. 6 is a schematic diagram of the effect of analyzing the superimposed fault attribute map in the first embodiment of the present invention.

In this embodiment, the superimposed fault attribute map can be used for comprehensive interpretation of faults: based on the main fault, a horizontal slice can be generated with a suitable distance value set from the starting point of the base. The fault gradually develops from strong to weak from the base upwards and can be divided into four development stages: initiation-R shear-P and Y shear-penetration, with different structural characteristics of the fault in each stage. Slicing the seismic data volume along the main fault and comparing the structural characteristics of the branch fault can determine the developmental stage of faults at different depths. In the cross-section fusion attribute maps of the fault are shown in FIG. 6:(a) tension section, located at the tail end of the fault in a tensile environment, with an echelon-like fault; (b) compression segment, located in the transition area from the tail to the middle of the fault, with obvious internal structure affected by the compression environment; (c) compression section, located in the middle of the fault, with stronger compression; (d) PDZ main displacement section, located in the middle of the fault, with a small number of branch faults, (e) PDZ main displacement section, located in the transition area from the middle to the tail of the fault, with obvious strike-slip and no branch faults. (f) tension section, located at the tail of the fault, with a large branching fault.

Step S600, determines whether the score of the branch fault data point is greater than the preset dominant fault score threshold, identifies the part that is greater than the preset dominant fault score threshold as the dominant fault area, and identifies the part that is less than the preset advantage fault score threshold as the non-dominant fault area;

Step S700, sets different bead distance ranges, and repeats Steps S500 to S600 to obtain graded dominant fault areas. In this embodiment, data points for different levels of dominant faults can be obtained by adjusting the threshold values of bead distance and dominant fault score. For example, increasing the threshold value of dominant fault scores results in dominant fault data points that better match the original dominant fault data points with string beads, giving faults greater advantages and improving the accuracy of precise positioning and navigation of deep oil and gas.

Although the above embodiment describes each step in the order mentioned, those skilled in the art will understand that, to achieve the effects of the present embodiment, the steps do not necessarily have to be executed in this order. They can be executed simultaneously (in parallel) or in reverse order. These simple variations are within the scope of protection of the present invention.

The second embodiment of the present invention provides a fault characterization system for precise navigation of deep oil and gas based on image fusion, which includes:

The seismic data pre-processing module is configured to acquire the original seismic data, conduct spectral shaping on the original seismic data to obtain the reshaped seismic waveform data, and conduct diffusion filtering and dip filtering on the reshaped seismic waveform data to obtain enhanced seismic data; The order of diffusion filtering and dip filtering can be swapped;

The amplitude gradient image acquisition module is configured to obtain the amplitude gradient image by calculating the amplitude gradient vector;

The dip attribute image acquisition module calculates the dip attribute image based on the enhanced seismic data;

The gradient amplitude attribute fault confidence region acquisition module is configured to obtain the gradient amplitude attribute fault confidence region through the ellipsoidal expansion method;

The dip attribute data volume acquisition module for defining the fault position is configured to multiply the dip attribute image with the confidence region of the fault irregularly to obtain the dip attribute data volume for defining the fault position;

The image fusion module is configured to fuse the gradient amplitude attribute fault confidence region with the dip angle attribute data volume that defines the fault position through a hierarchical wavelet transform method to obtain a superimposed fault attribute map;

The branch fault scoring module is configured based on the superimposed fault attribute map, dividing the bead-like structure; Based on the center point position of the bead-like structure, the number of bead data points within the set bead distance range is recorded as the score of branch fault data points;

The fault area analysis module is configured to determine whether the score of the branch fault data point is greater than the preset dominant fault score threshold, identify the part that is greater than the preset dominant fault score threshold as the dominant fault area, and identify the part that is less than the preset advantage fault score threshold as the non-dominant fault area;

The scale replacement module is configured to set different bead distance ranges, repeat the content of the branch fault scoring module and fault area analysis module to obtain graded dominant fault areas.

Those skilled in the art of the relevant technical field can clearly understand that, for the sake of brevity and convenience, the specific working process and related instructions of the system described above can be referred to as the corresponding process in the previous method embodiment. Therefore, it is not repeated here.

It should be noted that the above embodiment of the fault characterization system for precise navigation of deep oil and gas based on image fusion is only an example based on the division of various functional modules. In practical applications, the above functions can be assigned to different functional modules as needed, i.e. the modules or steps in the present invention embodiment can be further decomposed or combined. For example, the modules in the above embodiment can be merged into one module or further divided into multiple sub-modules to achieve all or part of the above-described functions. The names of the modules and steps involved in the embodiments of the present invention are only for the purpose of distinguishing each module or step and are not considered improper qualifications for the present invention.

Those skilled in the art of the relevant technical field can clearly understand that, for the sake of brevity and convenience, the specific working process and related instructions of the storage device and processing device described above can be referred to as the corresponding process in the previous method embodiment. Therefore, it is not repeated here.

Those skilled in the art should appreciate that various modules and method steps described in the embodiments disclosed herein may be implemented using electronic hardware, computer software, or a combination thereof. Corresponding software modules and program codes for implementing the method steps may be stored in a random access memory (RAM), memory, read-only memory (ROM), electrically programmable ROM, electrically erasable programmable ROM, registers, hard disk, a removable disk, CD-ROM, or any other form of storage medium known to those skilled in the art. To illustrate clearly the interchangeability of electronic hardware and software, the composition and steps of each of the examples have been described generally according to their functions in the above description. Whether these functions are executed in electronic hardware or software depends on the specific application and design constraints of the technical solution. Whether these functions are implemented in electronic hardware or software depends on the specific application and design constraints of the technical solution.

The terms "first," "second," etc. are used to differentiate similar objects and are not used to describe or indicate a specific order or sequence.

The term "comprising" or any other similar terminology thereof is intended to cover non-exclusive inclusion so that a process, method, article, or apparatus/device that comprises a list of elements is not limited to those elements but may include other elements not expressly listed or inherent to such process, method, article, or apparatus/device.

So far, the preferred embodiments of the present invention have been described in conjunction with the figures. However, it is readily understood by those skilled in the art that the scope of the present invention is not limited to these specific embodiments. On the premise of not departing from the principles of the present invention, those skilled in the art may make equivalent modifications or substitutions to the relevant technical features. These modified or substituted technical solutions will fall within the scope of protection of the present invention.

What is claimed is:

1. A fault characterization method for precise navigation of deep oil and gas based on image fusion is characterized in that the method comprises:
   step S100, acquires an original seismic data, conducts a spectral shaping on the original seismic data to obtain a reshaped seismic waveform data, and conducts a diffusion filtering and a dip filtering on the reshaped seismic waveform data to obtain an enhanced seismic data;
   step S200, based on the enhanced seismic data, obtains an amplitude gradient image by calculating an amplitude gradient vector;
   calculates a dip attribute image based on the enhanced seismic data;
   step S300, based on the amplitude gradient image, obtains a gradient amplitude attribute fault confidence region through an ellipsoidal expansion method;
   by multiplying the dip attribute image with the confidence region of the fault irregularly, a dip attribute data volume with limited fault location is obtained;
   step S400, fuses the gradient amplitude attribute fault confidence region with a dip angle attribute data volume that defines a fault position through a hierarchical wavelet transform method to obtain a superimposed fault attribute map;
   step S500, based on the superimposed fault attribute map, divides a bead-like structure;
   based on a center point position of the bead-like structure, number of bead data points within a set bead distance range is recorded as a score of branch fault data points;
   step S600, determines whether the score of the branch fault data points is greater than a preset dominant fault score threshold, identifies a part that is greater than the preset dominant fault score threshold as a dominant fault area, and identifies a part that is less than a preset advantage fault score threshold as a non-dominant fault area;
   step S700, sets different bead distance ranges, and repeats step S500 to S600 to obtain graded dominant fault areas.

2. The fault characterization method for precise navigation of deep oil and gas based on image fusion as described in claim 1 is characterized in that the spectral shaping comprises:
   the original seismic data includes a seismic record convolution model, which is represented in the frequency domain as:

$$s_{swa}(\omega)=\sigma(\omega)\xi_{ft}(\omega)$$

wherein, $s_{swa}(\omega)$ represents a seismic wavelet after the Fourier transform, $\sigma(\omega)$ represents a spectrum of a reflection coefficient after the Fourier transform, $\xi_{ft}$ represents a spectrum of a reflection coefficient after the Fourier transform, and $\omega$ represents an angular frequency;
   take a logarithm on both sides of a representation of the convolution model in the frequency domain to obtain a representation of a linear system of seismic records in the frequency domain:

$$lns_{swa}(\omega)=ln\sigma(\omega)+ln\xi_{ft}(\omega)$$

wherein $lns_{swa}(\omega)$ represents the linear system frequency domain representation of seismic record, $ln\sigma(\omega)$ represents a linear system frequency domain representation of seismic wavelet, and $ln\xi_{ft}(\omega)$ represents a linear system frequency domain representation of the reflection coefficient;
   carry out inverse Fourier transform on the frequency domain representation of the linear system of the seismic record to obtain a complex cepstrum sequence of a seismic record spectrum:

$$\tilde{s}_{swa}(t_{swa})=\tilde{\sigma}(t_{swa})+\tilde{\xi}_{ft}(t_{swa})$$

wherein, $\tilde{s}_{swa}(t_{swa})$ represents a complex cepstrum sequence of seismic waveform record, $\tilde{\sigma}(t_{swa})$ represents a complex cepstrum sequence of seismic wavelet, $\tilde{\xi}_{ft}(t_{swa})$ represents a complex cepstrum sequence of a stratum reflection coefficient, and $t_{sw}$ represents an arrival time of a seismic wave;
   a wavelet complex cepstrum sequence and a reflection coefficient complex cepstrum sequence in the complex cepstrum are separated by a low-pass filter, and a wavelet amplitude is extracted;
   based on the wavelet amplitude, simulate a seismic wavelet amplitude spectrum using a least squares method:

$$\sigma(f)=A(f)f^{a}e^{H(f)}$$

wherein, the least squares fitting parameter $a≥0$ is a constant, $\sigma(f)$ represents the wavelet amplitude spectrum, $H(f)$ and $A(f)$ represent polynomials of f, f represents a frequency of seismic wavelet, and 'e' represents a base number of natural logarithm;
   based on an amplitude spectrum of the simulated seismic wavelet, a maximum phase component and a minimum phase component of the wavelet is obtained;
   if the maximum phase component of the wavelet $\sigma(t)$ is $u_{pc}(t)$ and the minimum phase component is $v_{pc}(t)$, then the wavelet is $\sigma(t)$:

$$\sigma(t)=u_{pc}(t)\cdot v_{pc}(t)$$

a complex cepstrum of the amplitude spectrum is represented as:

$$2\tilde{\sigma}_0(t)=\tilde{u}_{pc}(t)+\tilde{v}_{pc}(t)+\tilde{u}_{pc}(-t)+\tilde{v}_{pc}(-t)$$

wherein, the complex cepstrum of the amplitude spectrum $\tilde{\sigma}_0(t)$ is symmetrically displayed on a positive and a negative axis of the complex cepstrum, $v_{pc}(-t)$ is the complex cepstrum of a minimum phase function corresponding to the minimum phase component $v_{pc}(t)$ of the seismic wavelet, $\tilde{u}_{pc}(-t)$ maximum phase function corresponding to the maximum phase component $u_{pc}(t)$ of the seismic wavelet;
   based on the complex cepstrum of the amplitude spectrum, determine a set of mixed-phase wavelet sets with a same amplitude spectrum, adjust Yu wavelet parameters, and on a premise of ensuring an integrity of a main frequency of the seismic wavelet, increase an effective bandwidth to a preset bandwidth threshold to obtain the reshaped seismic waveform data.

3. The fault characterization method for precise navigation of deep oil and gas based on image fusion as described in claim 2 is characterized in that the calculation method of the simulated seismic wavelet amplitude spectrum is:
   locating a maximum value of seismic signal amplitude spectrum in a seismic wave reflection signal data and a frequency corresponding to the maximum value;
   by fitting the maximum amplitude spectrum of the seismic signal and the simulated seismic wavelet amplitude spectrum through the least squares method, the coefficients of a parameter a and a polynomial H(f) are obtained, and corresponding frequency amplitude values of a fitted maximum value are obtained;

divide the maximum value of the seismic signal amplitude spectrum by the corresponding frequency amplitude value of the fitted maximum value, and then use a quotient to fit coefficients of the polynomial A(f).

4. The fault characterization method for precise navigation of deep oil and gas based on image fusion as described in claim 1 is characterized in that the dip filtering, specifically:

based on the reshaped seismic waveform data;
represent a local plane wave as:

$$\frac{\partial u_{lpw}}{\partial x} + \theta_{lpw} \frac{\partial u_{lpw}}{\partial t_{lpw}} = 0$$

wherein, $u_{lpw}(x, t_{lpw})$ represents a wave field function, x represents an offset distance or a horizontal distance, $\theta_{lpw}$ represents a local dip angle of a continuous spatiotemporal domain, and $t_{lpw}$ represents a time of the local plane wave;

the local plane wave solution operator is:

$$d_{res} = D * s_{sc}$$

wherein, $d_{res}$ represents a residual, $s_{sc}$ represents a seismic channel, and D represents a plane-wave destruction filter:

$$D = \begin{bmatrix} I & 0 & 0 & \cdots & 0 \\ -P_{1,2} & I & 0 & \cdots & 0 \\ 0 & -P_{2,3} & I & \cdots & 0 \\ \cdots & \cdots & \cdots & \ddots & \cdots \\ 0 & 0 & \cdots & -P_{N-1,N} & I \end{bmatrix}$$

wherein, $P_{i,j}$ represents a prediction factor for number of seismic channels from the i-th to the jth channel, which is a function of the local dip angle, $\theta_{lpw}$ and I and $P_{i,j}$ are both M×1-dimensional matrix;

the local dip angle $\theta_{lpw}$ is estimated by minimizing an objective function of prediction error d:

$$\theta_{lpw} = argmin \|D(\theta_{lpw})\|_2^2 + \xi_{reg}^2 \|s_{reg}[\theta lpw]\|_2^2$$

wherein, $\xi_{reg}$ represents a regularization proportion coefficient and $s_{reg}$ represents a reshaping regularization operator.

5. The fault characterization method for precise navigation of deep oil and gas based on image fusion as described in claim 1 is characterized in that the amplitude gradient image is obtained by:

based on the enhanced seismic data, select a direction of a seismic sample point to search for a scrambling value of an amplitude vector, and construct a gradient structure tensor field T(s, v) expression as follows:

$$T(s,v) = \begin{bmatrix} \int D_x^2 SW_N(s,v) & \int D_x D_y SW_N(s,v) & \int D_x D_z SW_N(s,v) \\ \int D_x D_y SW_N(s,v) & \int D_y^2 SW_N(s,v) & \int D_y D_z SW_N(s,v) \\ \int D_x D_z SW_N(s,v) & \int D_y D_z SW_N(s,v) & \int D_z^2 SW_N(s,v) \end{bmatrix}$$

wherein, $D_x$, $D_y$ and $D_z$ respectively represent a change rate of seismic amplitude along x, y, z with time t, $SW_N(s, v)$ represents a smoothing factor along azimuth v; a smoothing function is a multipoint Gaussian function;

after establishing a matrix in a s-direction, calculate an amplitude vector scrambling value as:

$$f(s,v) = \frac{3}{2} \frac{\lambda_2(s,v) + \lambda_3(s,v)}{\lambda_1(s,v) + \lambda_2(s,v) + \lambda_3(s,v)}$$

wherein, $\lambda_1$, $\lambda_2$ and $\lambda_3$ are respectively eigenvalues of a first structure tensor field, a second structure tensor field, and a third structure tensor field of the gradient structure tensor field (T(s, v));

the scrambling value of the amplitude vector form an amplitude gradient image.

6. The fault characterization method for precise navigation of deep oil and gas based on image fusion as described in claim 1 is characterized in that the dip attribute image is obtained by:

based on the enhanced seismic data, calculate an instantaneous wave velocity $K_x(x, y)$ in a horizontal direction and the instantaneous wave velocity $K_y(x, y)$ in a depth direction respectively:

$$K_x(x,y) = \frac{u(d^H u/dx) - u^H(du/dx)}{(u)^2 + (u^H)^2}$$

$$K_y(x,y) = \frac{u(d^H u/dy) - u^H(du/dy)}{(u)^2 + (u^H)^2}$$

wherein, u is an input data, a superscript H is a Hilbert operator, and d is a total differential;

calculate an instantaneous dip angle θ based on the instantaneous wave velocity $K_x(x, y)$ in the horizontal direction and the instantaneous wave velocity $K_y(x, y)$ in the depth direction:

$$\theta = tan^{-1}(k_x/k_y)$$

the instantaneous dip angle constitutes a dip angle attribute image.

7. The fault characterization method for precise navigation of deep oil and gas based on image fusion as described in claim 1 is characterized in that the gradient amplitude attribute fault confidence region is obtained by:

set value of points with attribute points below a preset fault threshold to 0, while keeping values of other points unchanged;

process a grid with attribute points higher than the preset fault threshold through the ellipsoidal expansion method to obtain an expanded fault position data volume; specifically:

in a process of ellipsoid expansion, an ellipsoid is raised to a required height Δ h along a direction of a mean curvature radius of a corresponding point P1 of a ground point P0 on an original ellipsoid E1, so that the ellipsoid coincides with an elevation projection plane;

set $R_1$ as the mean curvature radius of P0 on a foundation ellipsoid E1, and $R_2$ as the mean curvature radius of P1 on an expanded engineering ellipsoid E2; a specific algorithm of $R_1$ and $R_2$ is:

$$\begin{cases} R_1 = \sqrt{M \cdot N} = a_1 \cdot \sqrt{1 - e^2/(1 - e^2\sin^2 B_1)} \\ R_2 = R_1 + \Delta h = a_2 \cdot \sqrt{1 - e^2/(1 - e^2\sin^2 B_2)} \end{cases}$$

M and N represent a meridian radius of curvature of the original ellipsoid E1 and a radius of curvature of a prime vertical, $a_1$ and $a_2$ respectively represent a long half-axis of the foundation ellipsoid E1 and the long half-axis of the expanded engineering ellipsoid E2, e represent a first eccentricity of the ellipsoid, $B_1$ and $B_2$ respectively represent a geodetic dimensions of the reference point on the foundation ellipsoid E1 and the expanded engineering ellipsoid E2;
wherein:

$$\begin{cases} a_1 = R_1 \cdot (1 - e^2\sin^2 B_1)/\sqrt{1 - e^2} \\ a_2 = R_2 \cdot \dfrac{(1 - e^2\sin^2 B_2)}{\sqrt{1 - e^2}} = (R_1 + \Delta h) \cdot (1 - e^2\sin^2 B_2) \end{cases}$$

due to the dense data points and linear shape of a fault data group, the dimensional changes after expansion are negligible, and $B_1 \approx B_2$, or a variable 'da' of the long half-axis is:

$$da = \alpha_2 - \alpha_1 \approx \Delta h \cdot ((1 - e^2\sin^2 B_1)/\sqrt{1-e^2})$$

calculate an amount of change in the long half-axis to obtain a change in a volume of the ellipsoid; a position of the ellipsoid after the volume change is a position of the attribute point after expansion, and a value of a data point after the expansion is a average value of a data group a confidence region of the gradient amplitude attribute fault is obtained.

8. The fault characterization method for precise navigation of deep oil and gas based on image fusion described in claim 1 is characterized in that the image fusion carried out through the hierarchical wavelet transform method is specifically:

divide the gradient amplitude attribute fault confidence region and the dip angle attribute data volume defining the fault position into a high-frequency image and a low-frequency image through preset frequency boundary values;

based on the high-frequency image, define a local Log Gabor energy $LG_f(x, y)$ of a window at an any point in the high-frequency image (x, y) as:

$$LG_f(x, y) = \frac{1}{M \times N} \sum_{m=1}^{M} \sum_{n=1}^{N} T_f\left(x + m - \frac{M+1}{2}, y + n - \frac{N+1}{2}\right)$$

wherein, M×N represents a size of a local neighborhood window and $T_f$ represents a Log Gabor energy value of a current image f at (x, y)

high-frequency fusion rules are:

$$LG_{Hi}^A(x, y) = \frac{1}{M \times N} \sum_{m=1}^{M} \sum_{n=1}^{N} T_H^A\left(x + m - \frac{M+1}{2}, y + n - \frac{N+1}{2}\right)$$

$$LG_{Hi}^B(x, y) = \frac{1}{M \times N} \sum_{m=1}^{M} \sum_{n=1}^{N} T_H^B\left(x + m - \frac{M+1}{2}, y + n - \frac{N+1}{2}\right)$$

wherein, $$T_H^A\left(x + m - \frac{M+1}{2}, y + n - \frac{N+1}{2}\right)$$

is the Log-Gabor energy value of the gradient amplitude attribute at $$\left(x + m - \frac{M+1}{2}, y + n - \frac{N+1}{2}\right),$$

$LG_{Hi}^A(x, y)$ denotes an evaluated Log-Gabor energy value of the high-frequency image of the gradient amplitude attribute fault confidence region in the local neighborhood M×N, $$T_H^B\left(x + m - \frac{M+1}{2}, y + n - \frac{N+1}{2}\right)$$

is the Log-Gabor energy value of a dip angle attribute at $$\left(x + m - \frac{M+1}{2}, y + n - \frac{N+1}{2}\right), \left(x + m = \frac{M+1}{2}, y + n - \frac{N+1}{2}\right).$$

denotes the evaluated Log-Gabor energy value of the high-frequency image of the dip angle attribute data volume in the local neighborhood-window M×N;

a high-frequency component of a fused image is FHi, and a fusion coefficient is a coefficient with a larger local Log Gabor energy:

$$F_H(x, y) = \begin{cases} A_{Hi}(x, y), & LG_{Hi}^A(x, y) \geq LG_{Hi}^B(x, y) \\ LG_{Hi}^B(x, y), & LG_{Hi}^A(x, y) < LG_{Hi}^B(x, y) \end{cases}$$

wherein, $A_{Hi}$ is a value of the gradient amplitude attribute at (x, y), $F_H(x, y)$ denotes the Log-Gabor energy value of the high-frequency component of the fused image at (x, y);

based on the low-frequency image, compare a pixel points of the low-frequency image in the confidence region of the gradient amplitude attribute fault with the pixel points of the low-frequency image in the dip attribute data volume one by one to obtain a weight map $W_1$, $W_2$:

$$W_1 = \begin{cases} 1, & A_1 > A_2 \\ 0, & \text{else} \end{cases}$$

$$W_2 = \begin{cases} 1, & A_2 > A_1 \\ 0, & \text{else} \end{cases}$$

Wherein, $A_1$ is a pixel point value of a low frequency image of the gradient amplitude attribute fault confidence region. $A_2$ is the pixel point value of the low frequency image of the dip angle attribute data volume, a weighted fusion is performed on the weight map to obtain a processed low-frequency image A:

$$A = \frac{W_1 \times A_1 + W_2 \times A_2}{W_1 + W_2}$$

combine the Log Gabor energy values of the high-frequency components of the fused image at (x, y) with the processed low-frequency image A to obtain the superimposed fault attribute map.

9. The fault characterization method for precise navigation of deep oil and gas based on image fusion as described in claim 1 is characterized in that the center point position of the bead-like structure is obtained by:

based on the superimposed fault attribute map, average coordinates of each point are obtained to obtain a center position ($\bar{x}$, $\bar{y}$, $\bar{z}$) of the bead-like structure:

$$\bar{x} = \frac{\sum_1^n x_i}{n}$$

$$\bar{y} = \frac{\sum_1^n y_i}{n}$$

$$\bar{z} = \frac{\sum_1^n z_i}{n}$$

wherein, $x_i$, $y_i$ and $z_i$ represent coordinate values of three directions of data points, and n represents number of data points.

10. A fault characterization system for precise navigation of deep oil and gas based on image fusion characterized in that the system comprises:

a seismic data pre-processing module is configured to acquire an original seismic data, conduct a spectral shaping on the original seismic data to obtain a reshaped seismic waveform data, and conduct a diffusion filtering and a dip filtering on the reshaped seismic waveform data to obtain an enhanced seismic data;

an amplitude gradient image acquisition module is configured to obtain an amplitude gradient image by calculating an amplitude gradient vector;

a dip attribute image acquisition module calculates a dip attribute image based on the enhanced seismic data;

a gradient amplitude attribute fault confidence region acquisition module is configured to obtain a gradient amplitude attribute fault confidence region through an ellipsoidal expansion method;

a dip attribute data volume acquisition module for defining a fault position is configured to multiply a dip attribute image with the confidence region of the fault irregularly to obtain a dip attribute data volume for defining the fault position;

an image fusion module is configured to fuse the gradient amplitude attribute fault confidence region with a dip angle attribute data volume that defines the fault position through a hierarchical wavelet transform method to obtain a superimposed fault attribute map;

a branch fault scoring module is configured based on the superimposed fault attribute map, dividing a bead-like structure; based on a center point position of the bead-like structure, a number of bead data points within a set bead distance range is recorded as a score of branch fault data points;

a fault area analysis module is configured to determine whether the score of the branch fault data points is greater than a preset dominant fault score threshold, identify a part that is greater than the preset dominant fault score threshold as a dominant fault area, and identify a part that is less than a preset advantage fault score threshold as a non-dominant fault area;

a scale replacement module is configured to set different bead distance ranges, and repeat the content of the branch fault scoring module and fault area analysis module to obtain graded dominant fault areas.

\* \* \* \* \*